United States Patent
Romanowski (10) Patent No.: US 8,122,940 B2
(45) Date of Patent: Feb. 28, 2012

(54) METHOD FOR TWIN ROLL CASTING OF ALUMINUM CLAD MAGNESIUM

(75) Inventor: Christopher A. Romanowski, Riverside, CA (US)

(73) Assignee: Fata Hunter, Inc., Riverside, CA (US)

( * ) Notice: Subject to any disclaimer, the term of this patent is extended or adjusted under 35 U.S.C. 154(b) by 753 days.

(21) Appl. No.: 12/174,560

(22) Filed: Jul. 16, 2008

(65) Prior Publication Data

US 2010/0015469 A1    Jan. 21, 2010

(51) Int. Cl.
B22D 11/06   (2006.01)
B22D 19/00   (2006.01)

(52) U.S. Cl. .................................. 164/461; 164/480
(58) Field of Classification Search .................. 164/461, 164/419, 480
See application file for complete search history.

(56) References Cited

U.S. PATENT DOCUMENTS

| | | |
|---|---|---|
| 2,100,257 A | 11/1937 | Larson |
| 2,301,332 A | 11/1942 | Scheller |
| 2,317,510 A | 4/1943 | Barklie et al. |
| 2,651,835 A | 9/1953 | Jackson |
| 2,881,514 A | 4/1959 | Drummond |
| 3,148,952 A | 9/1964 | Foerster et al. |
| 3,179,504 A | 4/1965 | Bothwell |
| 4,973,393 A | 11/1990 | Mino et al. |
| 5,476,725 A * | 12/1995 | Papich et al. ................. 428/654 |
| 5,480,496 A * | 1/1996 | Ward ............................ 148/437 |
| 5,669,436 A | 9/1997 | Papich et al. |
| 6,902,828 B2 * | 6/2005 | Gazapo et al. ................. 428/654 |
| 6,913,840 B2 | 7/2005 | Nishikawa et al. |
| 2003/0164205 A1 * | 9/2003 | Prince et al. ..................... 148/29 |
| 2005/0236135 A1 * | 10/2005 | Liang et al. .................... 164/480 |

FOREIGN PATENT DOCUMENTS

| | | | |
|---|---|---|---|
| JP | 62-77153 A | * | 4/1987 |
| JP | 4-52052 A | * | 2/1992 |
| JP | 6-328270 | | 11/1994 |
| JP | 6-328617 | | 11/1994 |

OTHER PUBLICATIONS

Patent Abstracts of Japan, Publication No. 06-328270; Date of Publication Nov. 29, 1994; in the name of Onozawa et al.
Patent Abstracts of Japan, Publication No. 06-328617; Date of Publication Nov. 29, 1994; in the name of Onozawa et al.

(Continued)

*Primary Examiner* — Kevin P Kerns
(74) *Attorney, Agent, or Firm* — Christie, Parker & Hale, LLP (57) ABSTRACT

A method for twin roll casting aluminum clad magnesium by joining one or more sheets of aluminum cladding to molten magnesium during twin roll casting. The method includes feeding aluminum cladding to at least one roll of a pair of rotating rolls, feeding a core of molten magnesium into a continuous casting mold formed by the roll, solidifying the magnesium core by heat extraction to the rolls and through the aluminum cladding, surface treating the aluminum cladding and the magnesium core to prevent inter-diffusion between the aluminum cladding and the magnesium core, bonding the aluminum cladding with the magnesium core and extruding the composite core and aluminum cladding out of the continuous casting mold by a casting load exerted by the rolls.

10 Claims, 5 Drawing Sheets

OTHER PUBLICATIONS

"Continuous Casting Magnesium Sheet" in *Light Metal Age*, Feb. 2002, p. 101.

Jung, In-Ho, et al. "*Mg Coil Production via Strip Casting and Coil Rolling Technologies.*" Magnesium Technology, 2007, TMS (The Minerals, Metals & Materials Society), p. 85-88.

*Offering Memorandum*, Magwerkes Canada Inc., Dated Nov. 15, 1988, 55 pages.

International Search Report and Written Opinion for International Application No. PCT/US09/50868, mailed Aug. 27, 2009, 8 pages.

\* cited by examiner

METHOD FOR TWIN ROLL CASTING OF ALUMINUM CLAD MAGNESIUM

BACKGROUND OF THE INVENTION

This invention relates to metal sheet, and more specifically to a method for producing aluminum clad magnesium by twin roll casting.

Magnesium is approximately ⅔ of the density of aluminum and thus has advantages in weight-critical applications. Magnesium sheet has been used since the 1930's for a number of aerospace applications. During the second world war, both aluminum and magnesium sheet were widely utilized, but after the war, only aluminum successfully made the transition to the consumer market. Magnesium sheet was briefly used for some premium applications but began to fade out and virtually disappeared from the consumer market by the 1970's. Magnesium's demise was mainly due to the high cost of magnesium sheet. The high cost was a result of the high price of magnesium metal and the expensive transformation process required to convert the metal into sheet.

Immediately after the war, both aluminum and magnesium were manufactured in a similar manner. The metal was first cast into an ingot which was then cooled to room temperature. To remove casting imperfections, the top and bottom of the ingot were removed by sawing and the faces of the ingot were scalped. The ingot was then reheated and hot rolled to make a coil of 3 mm to 7 mm thick strip. In the case of magnesium, the ingot was sometimes substituted by an extruded slab.

In the case of aluminum, the hot rolling was initially performed on a reversing hot mill. The mill rolls the ingot into a plate that becomes progressively thinner and longer. The plate traverses either side of the mill on "run-out" tables. Depending on the desired coil size and production required, the final passes are either performed on this same reversing mill using coilers that are engaged on one, or both, sides of the mill, or alternatively, the rolled plate was passed into a series of tandem hot mills which rolled the plate in one continuous operation into the finished coil. The tandem mill approach had a higher production and could make larger coils. After leaving the hot mill, the coils could then be cold rolled at room temperature to the final gauge required for the finished product. Most modern, high volume, production processes require the sheet to be delivered in coil form. Hot mills use a water based emulsion as a lubricant and cold mills use a light oil similar to kerosene.

In the case of magnesium and most common magnesium sheet alloys, the metal due to its hexagonal close-packed crystal structure of the metal limits its deformation abilities at lower temperatures. This required frequent reheating in off-line ovens to maintain the temperature between 250 C and 450 C. Below this temperature the metal had the tendency to crack during rolling. Handling and reheating oven constraints limited the maximum slab size and traditionally made magnesium sheet production virtually a sheet-by-sheet operation. This was a very labor and energy intensive, inefficient method of production and contributed to the high cost of magnesium sheet. Even today, only small size coils of magnesium sheet are available.

The aluminum industry saw significant change in the 1950's when twin roll continuous casters were developed. This machine used twin water cooled rolls to simultaneously cast and warm roll molten aluminum directly into coils of 3 mm to 7 mm thick, a gauge suitable for subsequent cold rolling. This process eliminated the ingot casting and hot rolling operations and thus significantly reduced the conversion cost of transforming the aluminum to finish gauge. This lower transformation cost reduced the price of aluminum sheet and helped aluminum make the transition from an aerospace material to an everyday material used for products such as construction, transportation and packaging.

As stated above, magnesium, having a lower density than aluminum, has advantages in weight-critical applications. Two potential major markets for magnesium sheet include the consumer electronics industry such as cell phones, notebook computers, cameras, MP3 players, etc., and in automotive applications. The light weight, thermal and electrical conductivity, electromagnetic shielding and dent resistance of magnesium make it attractive for personal electronics, whereas the potential weight savings and resultant fuel efficiency make it attractive for automobiles. Magnesium alloys have previously been used in automobiles in the form of castings such as for instrument panel carriers, pedal brackets, seat components, etc., but the metal is difficult to use for applications such as engine blocks, transmission cases, etc., as it has poor elevated temperature creep properties. Thus to further increase the use of magnesium and magnesium alloys in automobiles, it must be available in sheet form.

Magnesium does, however, have some significant disadvantages for both electronic and automotive applications, including that magnesium is more reactive than aluminum. As magnesium must be finished rolled at an elevated temperature and because it must be formed into a finished part at an elevated temperature, the surface tends to be more oxidized and must be cleaned after forming which adds to cost. Considering magnesium is more reactive than aluminum, it has a lower corrosion resistance. This is particularly important for automobile applications. In corrosive environments, the magnesium sheet surface requires special finishing treatments that form a protective coating. These finishes are typically some form of anodic or conversion coating, but metallic plating has also been used for aerospace applications. Both types of coating are prone to micro pinholes that allow diffusion of the magnesium to the surface reducing the corrosion resistance of the coated sheet. In the case of metallic plating where an electrically conductive film of gold, aluminum or the like is applied to the surface, a galvanic cell is formed between the magnesium and the coating, thereby accelerating the corrosion of the magnesium. Furthermore, these protective coatings are thin and susceptible to damage that will also result in localized corrosion.

Although paint systems for aluminum autobody parts are well established, they need to be developed and optimized for magnesium sheet. Similarly, spot welding technologies for aluminum auto parts are well established, however they also need to be developed and optimized for magnesium sheet. Adhesive bonding systems for aluminum autobody parts are also well established, however they too need to be developed and optimized for magnesium sheet.

Considering there are corrosion problems when dissimilar metals are joined, one of the short term applications foreseen for magnesium sheet is to use it as the inner structure for hoods, trunk lids, doors, etc., and use aluminum for the outer panel. This design creates a potential for corrosion issues. Another problem is that there is a public perception that magnesium can easily catch fire. And finally, another disadvantage of magnesium is that magnesium has a lower elastic modulus than aluminum.

In recent years, the world magnesium market has seen an influx of inexpensive magnesium ingot manufactured abroad which has driven down magnesium metal prices and rekindled the interest in magnesium sheet. Although much of this magnesium price decline has been reversed in recent months, the increasing price of oil has maintained interest in the potential for energy saving by using light weight magnesium sheet. Consequently, a need exists to inexpensively produce magnesium sheet which considers and solves the problems inherent in the use of magnesium.

SUMMARY OF THE INVENTION

The present invention addresses the problems associated with the production of magnesium sheet in a form that is suitable for use in the consumer electronics industry and the automotive industry. The present invention addresses the problems of magnesium by providing a process to produce aluminum clad magnesium sheet by twin roll casting. The present invention can clad one or both sides of cast magnesium strip with a corrosion resistant aluminum alloy during twin roll casting. Cladding twin roll cast magnesium sheet with aluminum provides the benefits of easier processing of magnesium cast coil with less oxidation during rolling, reheating, annealing and forming operations. This method would allow many standard aluminum industry annealing furnace atmospheres, rolling oils/additives and cleaning systems to be used. Aluminum cladding twin roll cast magnesium sheet greatly improves corrosion resistance of the magnesium sheet. Many of the present magnesium sheet alloys are compromised between mechanical properties and corrosion resistance and cladding would decouple the mechanical properties from the corrosion resistant and allow both to be optimized. Producing an aluminum clad magnesium sheet would allow the utilization of painting systems developed for aluminum, joining techniques for aluminum autobody parts such as spot welding, adhesive bonding, etc., eliminate corrosion concerns about joining aluminum with clad magnesium components, greatly improve fire resistance of the magnesium. Finally aluminum clad magnesium sheet would produce a resultant composite sheet structure having improved modulus because the surfaces would consist of higher modulus aluminum.

The present invention also would allow the use of an oil and water emulsion for hot rolling. Aluminum is usually hot rolled using an oil and water emulsion which could not be used on magnesium because magnesium tends to chemically react with the water in the emulsion, causing the deterioration in the surface quality and more significantly the water in the emulsion can cause areas of localized cooling which will then crack during rolling. The localized cooling is due to the high heat removal rate of the water and the relatively low thermal conductivity of the magnesium. Aluminum cladding due to its lower reactivity will not react with the water in the emulsion. In addition, aluminum cladding due to its higher thermal conductivity will help prevent areas of localized surface cooling and minimize the possibility for cracking during hot rolling, particularly when rolling with an emulsion.

According to the method of the present invention, clad aluminum alloy material is manufactured in a direct continuous casting method, twin roll casting, by feeding in band shaped sheet of aluminum alloy cladding material to at least one roll of a pair of rotating, cooled rolls. Into the continuous mold formed by the sheet and the roll, there is simultaneously fed core material in the form of molten magnesium, which is solidified by heat extraction to the rolls and through the band, or bands. A composite material, comprised of the band shaped skin material and solidified melt core material, is then extruded out of the continuous mold via the casting load exerted by the rolls.

The band shaped sheet of aluminum cladding material serves as the skin material for the clad product. The aluminum cladding material is fed in along one of the rolls if one of the surfaces is to be clad, but separate sheets can be fed in along both rolls in the manufacture of a product requiring both surfaces to be clad while the magnesium melt is solidified between both sheets. The band shape sheet of aluminum alloy cladding material is fed in along the roll at an arc of contact of greater than five degrees while simultaneously applying tension to the sheet via a friction breaking system or any other suitable method of tension application. The band shaped sheet of aluminum cladding material is preferably in a thickness range incoming to the roll bite from 0.006 to 0.070 inches. Thinner bands have a tendency to wrinkle during the cladding operation, whereas the upper thickness is only limited by the cladding becoming too large a proportion of the composite sheet thickness. The aluminum band used for the cladding can either be fabricated from hot rolled material, or from strip that was made by a separate twin roll casting process. The mechanical properties of the aluminum cladding can be adjusted by controlling the cold rolling and annealing process that follows the hot rolling or twin roll casting. The surface of the aluminum band may be cleaned prior to the cladding process to remove any oil residues, heavy oxides or other contaminants that would be detrimental to the cladding process. After cladding in the twin roll caster the composite strip can be hot, warm and cold rolled with suitable thermal treatments to achieve the desired final properties.

DETAILED DESCRIPTION

Figure 1:
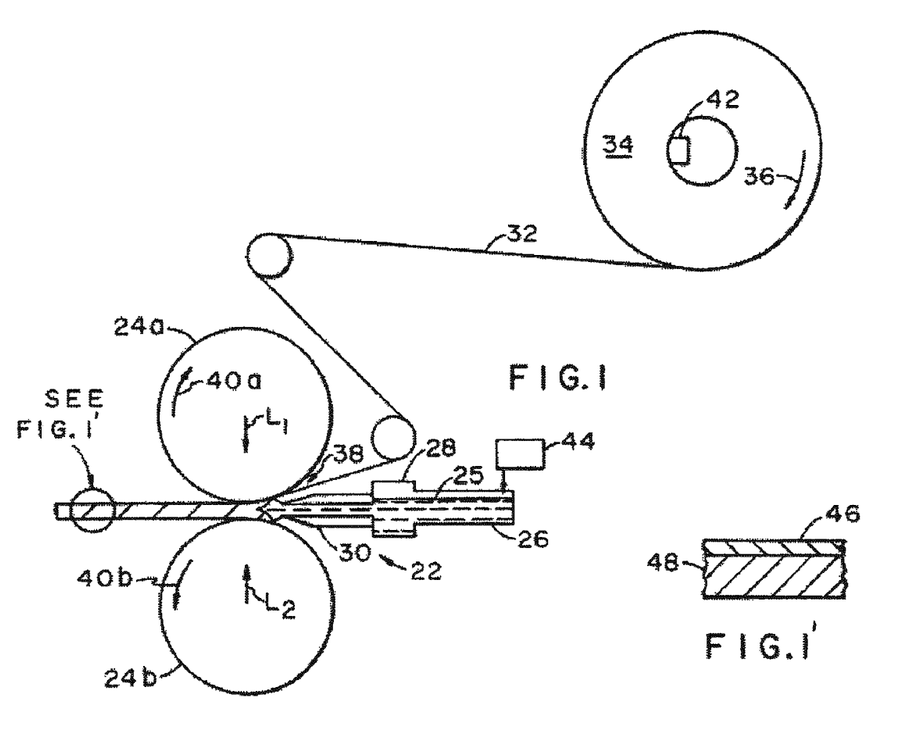
FIG. 1 is a schematic illustration of the method of the present invention of twin roll casting aluminum clad magnesium.

Referring now to the process schematic drawings, FIG. 1 shows a twin roll caster 22, including internally cooled steel rolls 24a and 24b, and a delivery system for delivering molten magnesium 25. The delivery system is comprised of a trough 26, a tundish, or head box 28, and a caster feed, or nozzle tip 30. According to the invention, a band 32 of aluminum cladding is fed into the twin roll caster by unwinding from a coil 34 by rotation in direction 36. The band 32 is drawn into the roll bite 38 by the rotation of rolls 24a and 24b in the directions 40a and 40b. Brake 42 permits control of the tension in band 32. Hot working of solidified magnesium 25 and band 32 occur in the roll bite 38, as indicated by the opposing axle bearing loads $L_1$ and $L_2$. Alloying constituents may be added directly into channel 26 from feeder 44. FIG. 1 includes a detail FIG. 1' which shows the twin roll cast composite product, including aluminum cladding 46 originating from band 32 and core 48 originating from magnesium 25. Although reference is made herein to "magnesium" and "aluminum" it is to be understood that the present invention contemplates the use of pure metals as well as any magnesium and aluminum alloys such as, for example, magnesium AZ31B and aluminum 7072.

Figure 2:
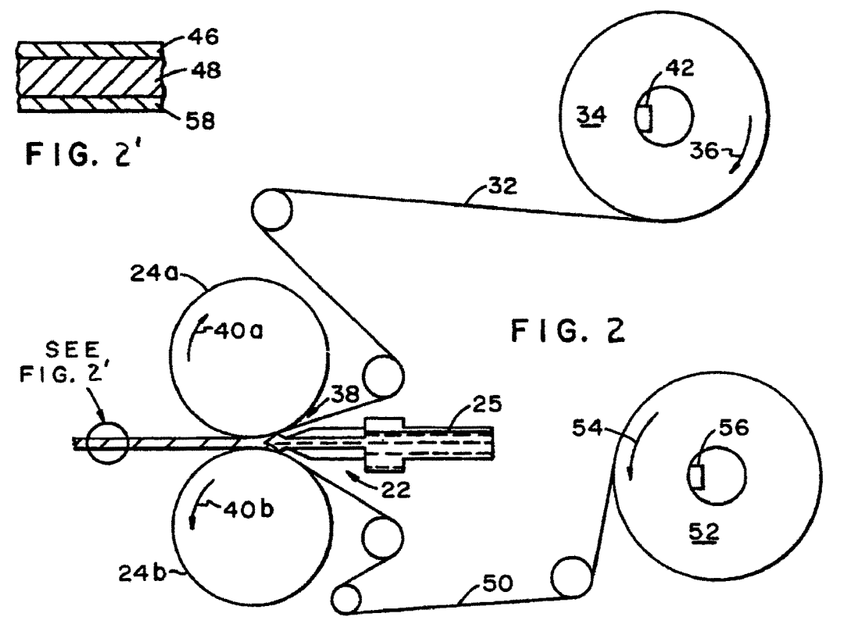
FIG. 2 is a first alternative method of the method of FIG. 1.

The caster in FIG. 2 differs from that in FIG. 1 in the provision of means for feeding another band of aluminum cladding, band 50, into the other side of the roll caster by unwinding from a coil 52 by rotation in direction 54. The band 50 is drawn into the roll bite 38 also by the rotation of rolls 24a and 24b in the directions 40a and 40b. Brake 56 permits control of the tension in band 50. FIG. 2 includes a detail FIG. 2' which shows the twin roll cast composite product, including aluminum cladding 58 originating from band 50.

Figure 3:
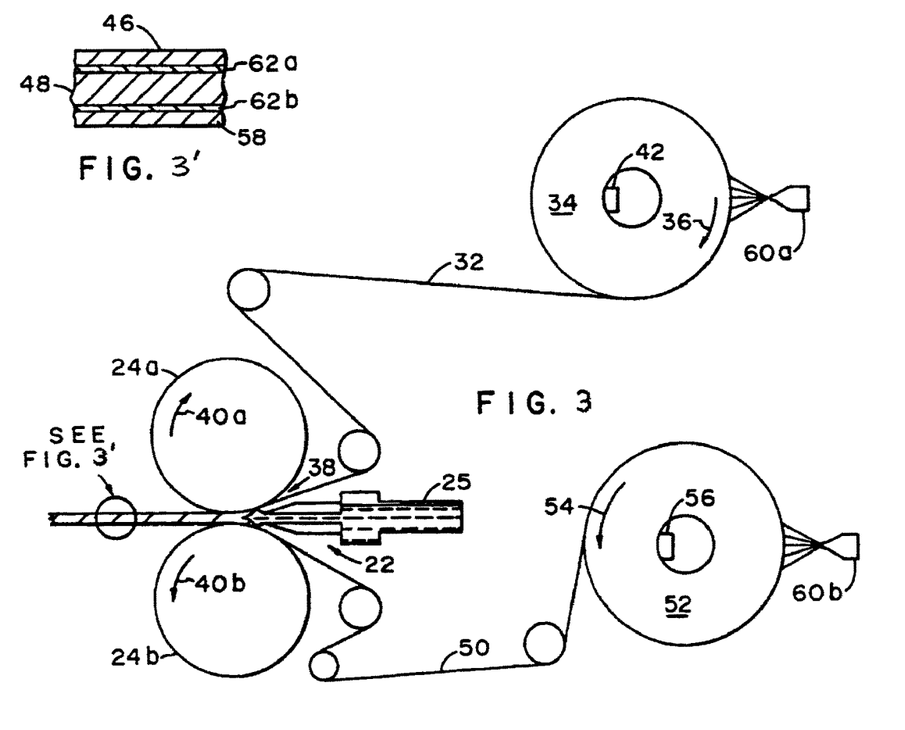
FIG. 3 is a second alternative method of the method of FIG. 1.

The caster in FIG. 3 differs from that in FIG. 2 in the provision of means for providing thermally sprayed interlayers in the composite. Thermal spray deposition stations 60a and 60b spray a coating of, for instance, zinc onto bands 32 and 50. The coatings on the bands occur as interlayers 62a and 62b in the roll cast composite product, as shown in the detail FIG. 3'. The purpose of this zinc coating is to prevent inter-diffusion between the magnesium and the aluminum that may result in the formation of brittle intermetallic compounds at the interface. While formation of these compounds is a concern with conventional roll bonding on a hot mill, the rapid cooling rate of the twin roll casting process quickly cools the composite below the temperature at which substantial diffusion occurs between the magnesium and aluminum. Thus, for many products, the application of this thermally sprayed zinc surface layer on the cladding band surface is largely redundant. It may be necessary, however, if the composite strip undergoes any subsequent forming operation that involves a prolonged period of preheating in the temperature range at which inter-diffusion may occur.

Figure 4:
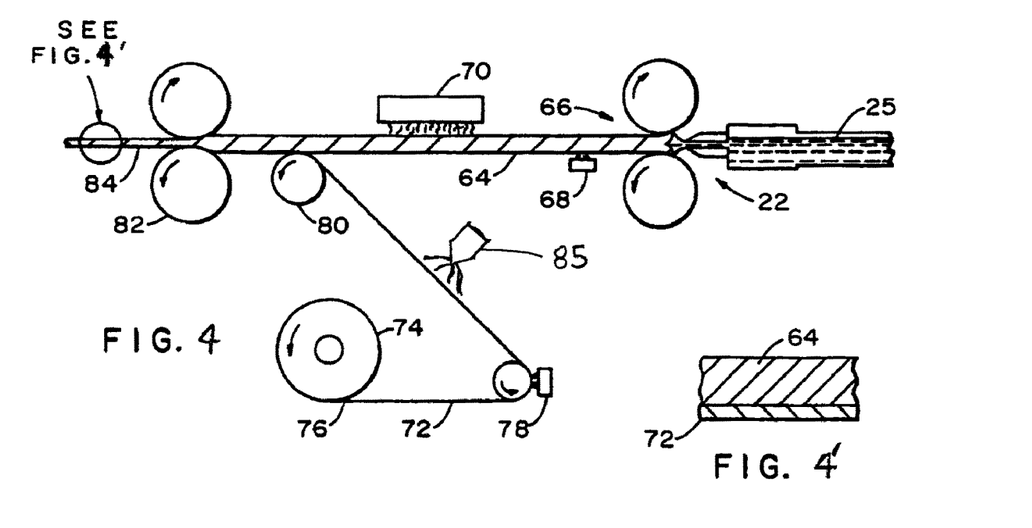
FIG. 4 is a third alternative method of the method of FIG. 1.

FIG. 4 shows an embodiment of the exit side laminating process variant of the invention. A band 64 of solid magnesium in the form of the solidification product of molten magnesium 25, is shown emerging from the exit side 66 of twin roll caster 22. Band 64 is given a surface preparation treatment, if required. In this case, the band is shown receiving a surface preparation treatment by an MIA (magnetically impelled arc) cleaning head 68. Additionally, band 64 is pre-heated by a suitable heat source 70. Concurrently with the movement of band 64 out of roll caster 22, a band 72 of aluminum cladding is being fed from coil 74 at cladding unwind station 76. Band 72 is likewise given a surface preparation treatment, if required. In this case, the band is shown receiving a surface preparation treatment by an MIA (magnetically impelled arc) cleaning head 78, which is constructed in the manner of head 68. After surface preparation band 72 is passed through a thermal spray deposition station 85 where a coating of, for instance zinc, is applied to prevent inter-diffusion between the magnesium and the aluminum that will result in the formation of brittle intermetallic compounds at the interface. Although the thermal spray station is shown on the cladding band 72, it could equally well be applied to the magnesium band 64. In some cases, operation of only one of the heads 68 and 78 may be sufficient. Band 72 is preheated at heated roll 80, and then bonded to band 64 in rolling mill 82 to form a clad sheet product 84, composed, as indicated in the detail view FIG. 4' of a magnesium band 64, and an aluminum cladding 72.

Figure 5:
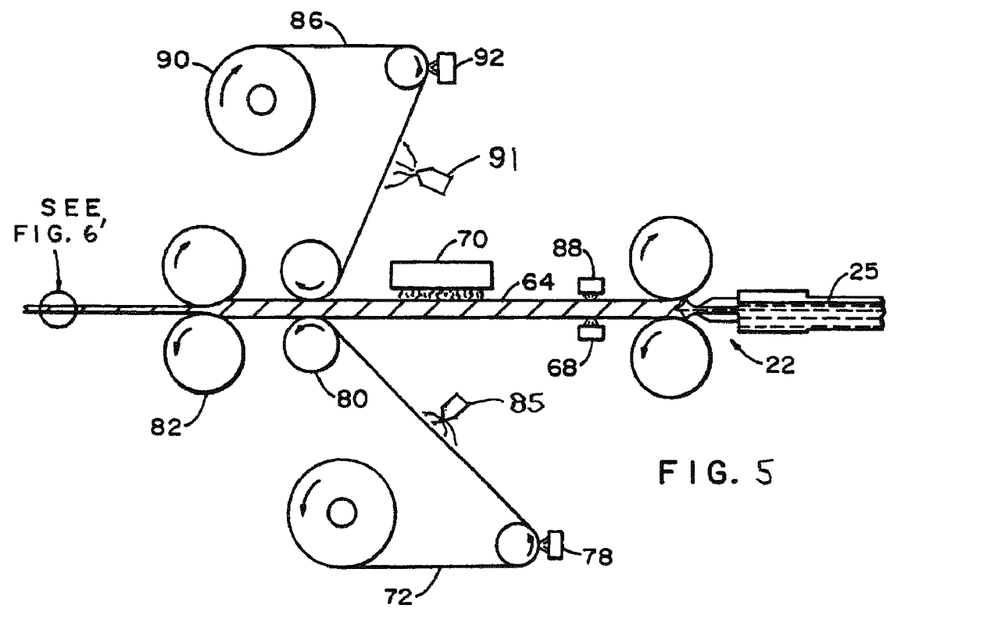
FIG. 5 is a fourth alternative method of the method of FIG. 1.

The caster in FIG. 5 differs from that in FIG. 4 in the provision of means for feeding another band of aluminum cladding 86, into the other side of the rolling mill 82. Surface preparation is provided on both sides of band 64 by the provision an additional MIA cleaning head 88 and thermal spray station 91. Band 86 is fed from a coil 90 and cleaned by MIA cleaning head 92. The clad sheet product is composed, as indicated in the detail view FIG. 6' of a magnesium band 64, and two aluminum cladding bands 72 and 86.

Figure 6:
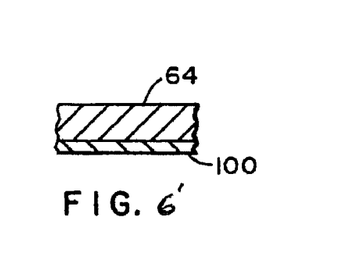
FIG. 6 is a fifth alternative method of the method of FIG. 1.

FIG. 6 shows an embodiment of applying cladding to a core by a thermal spray process, for instance arc spray. A magnesium band 64 emerges from the twin roll caster 22 and is given a surface preparation treatment, in this case by scratch brush 94. The band is then pre-heated at 70 and, from there, moves over thermal spray deposition heads 96, where the first head applies a coating to prevent inter-diffusion between the magnesium and the aluminum that will result in the formation of brittle intermetallic compounds at the interface, and subsequent heads apply an aluminum cladding is applied, to form composite product 98, composed, as indicated in the detail view FIG. 6', of a core magnesium band 64, and an aluminum cladding 100.

Figure 7:
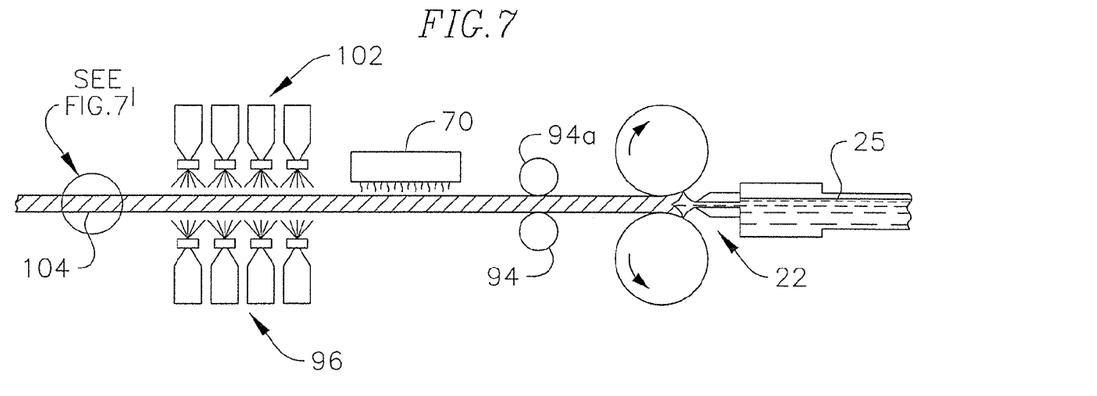
FIG. 7 is a sixth alternative method of the method of FIG. 1.

The caster in FIG. 7 differs from that in FIG. 6 in the provision of a second set of thermal spray deposition heads 102, for spray of a second aluminum cladding to form a two-side clad product 104, composed, as indicated in the detail view FIG. 7' of a core magnesium band 64, and two aluminum cladding layers 100 and 106. The core magnesium band 64 is given a surface preparation treatment on both sides, in this case by scratch brushes 94 and 94a. The caster depicted in the Figures depict the strip exiting the rolls in a horizontal plane for ease of illustration. It is to be understood that casting can be done at any angle and preferably at a 15 degree tilt back angle from the vertical position.

Although the present invention has been described with respect to a preferred method and various embodiments thereof, it is to be understood that changes and modifications can be made therein which are within the full intended scope of the invention as hereinafter claimed.

What is claimed is:

1. A method for manufacturing a clad magnesium sheet comprising the steps of:
   feeding aluminum cladding to at least one roll of a pair of rotating rolls;
   feeding a core of molten magnesium into a continuous casting mold formed by the roll;
   solidifying the magnesium core by heat extraction to the rolls and through the aluminum cladding;
   surface treating at least one of the aluminum cladding and the magnesium core to prevent inter-diffusion between the aluminum cladding and the magnesium core;
   bonding the aluminum cladding with the magnesium core; and
   extruding the composite magnesium core and aluminum cladding out of the continuous casting mold by a casting load exerted by the rolls,
   thereby resulting in the clad magnesium sheet having improved paintability, weldability, bonding, corrosion and fire resistance, and surface modulus characteristics.

2. The method of claim 1 wherein the step of feeding aluminum cladding comprises feeding two separate strips of aluminum cladding, one for each opposite side of the core.

3. The method of claim 1 further comprising the step of interposing between the aluminum cladding and the magnesium core a barrier layer.

4. The method of claim 3 wherein the step of interposing the barrier layer is by thermal spray deposition.

5. A method of claim 1 further comprising the step of hot rolling the composite magnesium core and aluminum cladding in a water and oil emulsion.

6. The method of claim 1 wherein the step of feeding aluminum cladding to the roll is at an arc of contact of greater than 5 degrees while simultaneously applying tension to the aluminum cladding.

7. The method of claim 1 further comprising the step of surface treating both the aluminum cladding and the magnesium core prior to bonding.

8. The method of claim 7 wherein the surface preparation treatment is by a magnetically impelled arc cleaning head.

9. The method of claim 1 wherein the step of feeding aluminum cladding comprises unwinding a strip of aluminum cladding from a coil.

10. The method of claim 1 wherein the step of feeding aluminum cladding is by a thermal spray process.

* * * * *